(12) United States Patent
Kimura et al.

(10) Patent No.: US 9,019,507 B2
(45) Date of Patent: Apr. 28, 2015

(54) OPTICAL APPARATUS

(71) Applicant: Hitachi, Ltd., Chiyoda-ku, Tokyo (JP)

(72) Inventors: Shigeharu Kimura, Yokohama (JP); Masataka Shirai, Higashimurayama (JP); Koichi Watanabe, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/735,092

(22) Filed: Jan. 7, 2013

(65) Prior Publication Data

US 2013/0215422 A1 Aug. 22, 2013

(30) Foreign Application Priority Data

Feb. 21, 2012 (JP) ................................. 2012-034635

(51) Int. Cl.
*G01J 3/45* (2006.01)
*G01J 3/44* (2006.01)
*G01J 3/453* (2006.01)

(52) U.S. Cl.
CPC .... *G01J 3/45* (2013.01); *G01J 3/44* (2013.01); *G01J 3/453* (2013.01)

(58) Field of Classification Search
USPC .......... 356/451, 487, 491, 301, 307, 456, 484
See application file for complete search history.

(56) References Cited

U.S. PATENT DOCUMENTS

| | | | | |
|---|---|---|---|---|
| 4,405,237 | A * | 9/1983 | Manuccia et al. | 356/301 |
| 6,934,020 | B2 * | 8/2005 | Shimada | 356/301 |
| 7,388,668 | B2 * | 6/2008 | Potma et al. | 356/451 |
| 7,688,505 | B2 * | 3/2010 | Vodyanoy et al. | 359/387 |
| 8,120,772 | B2 * | 2/2012 | Cicerone et al. | 356/301 |
| 8,482,738 | B2 * | 7/2013 | Rimke et al. | 356/484 |
| 2008/0059135 | A1 | 3/2008 | Murugkar et al. | |
| 2010/0309465 | A1 * | 12/2010 | Liu et al. | 356/301 |
| 2011/0128538 | A1 * | 6/2011 | Cerullo et al. | 356/301 |
| 2012/0050733 | A1 * | 3/2012 | Takimoto | 356/301 |
| 2012/0092665 | A1 | 4/2012 | Langbein et al. | |

FOREIGN PATENT DOCUMENTS

JP 2006-276667 10/2006

OTHER PUBLICATIONS

Richard Paxman. "Joint estimation of object and aberrations by using phase diversity". Opt. Soc. Jul. 1992.*
Tahei Tahara. "Picosecond time resolved multiplex coherent anti-Stokes Raman scattering spectroscopy by using a streak camera: Isomerization dynamics of all-trans and cis retinal in the lowest excited triplet state", Jan. 15, 1994.*
James P. R. Day et al., Quantitative Coherent Anti-Stokes Raman Scattering (CARS) Microscopy, The Journal of Physical Chemistry B 2011, 115, pp. 7713-7725.
Conor L. Evans et al., Coherent anti-Stokes Raman scattering spectral interferometry: determination of the real and imaginary components of nonlinear susceptibility $X^{(3)}$ for vibrational microscopy, Optics Letters, Dec. 15, 2004, pp. 2923-2925, vol. 29, No. 24.
Masanari Okuno et al, Quantitative CARS Molecular Fingerprinting of Single Living Cells with the Use of the Maximum Entropy Method, Angew. Chem, Int. Ed. 2010, 49, 6773-6777.

* cited by examiner

*Primary Examiner* — Kara E Geisel
*Assistant Examiner* — Maurice Smith
(74) *Attorney, Agent, or Firm* — Baker Botts L.L.P.

(57) ABSTRACT

A signal is amplified by making a CARS beam from an observed body and a reference beam which is a portion of a super continuum beam and has a frequency of $\omega_{AS}=2\omega_P-\omega_{ST}$ interfere with each other and taking out the signal from an interference beam of the CARS beam and the reference beam.

7 Claims, 8 Drawing Sheets

OPTICAL APPARATUS

CLAIM OF PRIORITY

The present application claims priority from Japanese patent application JP 2012-034635 filed on Feb. 21, 2012, the content of which is hereby incorporated by reference into this application.

CROSS-REFERENCE TO RELATED APPLICATION

This application is related to U.S. application Ser. No. 13/546,055 filed on Jul. 11, 2012, the disclosure of which is hereby incorporated by reference.

FIELD OF THE INVENTION

The present invention relates to an optical apparatus which requires an optical resolving power, particularly relates to an optical apparatus which focuses a light beam and acquires a response signal by relatively changing a position of irradiating an observed body with the light beam.

BACKGROUND OF THE INVENTION

A Raman spectroscopic microscope is very effective for observing a sample related to an organism. In the Raman spectroscopic microscope, an observed object is irradiated with a laser beam focused thereto, and a generated Raman scattering beam is detected. The Raman scattering beam is shifted from a wavelength of an excitation beam in a frequency thereof, and a spectrum is obtained by a spectroscope or the like. Positions of the observed object and an irradiation beam are changed relative to each other and the observed object is scanned by which spectroscopic spectra at respective positions can be obtained. An image can be formed based on the spectra. Raman spectra at respective observation positions reflect a vibrational excitement state of a molecule which is present at the positions, and are characteristic to the molecule. When a cell of an organism is observed by making use of the characteristic of the spectra, a distribution of organism molecules in a tissue is known.

FIG. 2 shows an energy level diagram showing a procedure of bringing about Raman scattering. Although there are stokes scattering and anti-stokes scattering in Raman scattering, only stokes scattering is shown in FIG. 2. Numeral 701 designates a vibrational ground state of a molecule, and numeral 702 designates a vibrational excitement state thereof. When a molecule is irradiated with a pumping beam having a frequency $\omega_P$, a beam having a frequency $\omega_S$ is scattered by way of an intermediate state 703. At this occasion, the molecule results in one of vibrational excitement states. The frequency $\omega_S$ of the scattering beam becomes a frequency of the stokes beam the frequency of which is lower than the frequency of the pumping beam. There are plural levels of vibrational excitement states of a molecule, and the vibrational excitement state differs depending on a kind of a molecule, a probability of transition from the intermediate state to the level of the vibrational excitement state differs, and therefore, a spectrum particular to the molecule is formed. A Raman shift frequency $\Omega$ is expressed by $\Omega = \omega_P - \omega_S$, and becomes a positive value in a case of stokes scattering. In a, case of an anti-stokes beam, an initial state is a vibrational excitement state of a molecule, and a state of the molecule results in a vibrational ground state by way of an intermediate level. In this case, when notation $\omega_{AS}$ designates a frequency of the anti-stokes beam, $\omega_P < \omega_{AS}$ is established, that is, a frequency of an anti-stokes Raman scattering beam is higher than a frequency of a pumping beam.

The Raman scattering described above has a weak intensity of the scattering beam obtained, and therefore, time is taken for measurement. As a system of obtaining a strong scattering beam, there is a spectrometry which uses nonlinear Raman scattering referred to as CARS (Coherent Anti-Stokes Raman Scattering). Raman scattering can be obtained even by the method, and a vibrational state of a molecule can be known. A pulse laser having a high peak power is used for generating CARS. Thereby, a signal which is remarkably stronger than an a signal of Raman scattering is obtained, that is, a signal of a high signal to noise ratio is obtained, and a measurement time period can remarkably be shortened.

CARS is light emission by a third-order polarization, and a pumping beam, a stokes beam, and a probe beam are needed for generating CARS. Generally, a pumping beam substitutes for a probe beam in order to reduce a number of light sources. In this case, an induced third-order polarization is expressed as follows.

Equation 1

$$P_{AS}^{(3)}(\omega_{AS}) = |\chi_r^{(3)}(\omega_{AS}) + \chi_{nr}^{(3)}|E_P^2(\omega_P)E_S^*(\omega_S) \qquad (1)$$

Here, notation $\chi_r^{(3)}(\omega_{AS})$ designates a resonance term of a molecular vibration of an electric third-order susceptibility, and notation $\chi_{nr}^{(3)}$ designates a non-resonance term thereof. Also, electric fields of the pumping beam and the probe beam are expressed as $E_P$, and an electric field of the stokes beam is expressed as $E_S$. The non-resonance term does not have frequency dependency. An asterisk attached to the shoulder of $E_S$ of Equation 1 indicates complex conjugate. An intensity of a CARS beam is expressed as follows.

Equation 2

$$I_{CARS}(\omega_{AS}) \propto |P_{AS}^{(3)}(\omega_{AS})|^2 \qquad (2)$$

An explanation will be given of a mechanism of generating the CARS beam in reference to an energy level diagram of a molecule (FIG. 3). The diagram shows a process of the resonance term. Similar to FIG. 2, a numeral 701 designates a vibrational ground state of a molecule and numeral 702 designates a vibrational excitement state thereof. A pumping beam having a frequency $\omega_P$ and a stokes beam having a frequency $\omega_S$ are simultaneously irradiated. At this occasion, the molecule is excited to a certain vibrational excitement level of 702 by way of an intermediate state 703. When the molecule which is brought into the excitement state is irradiated with a probe beam having a frequency $\omega_P$, the molecule returns to the vibrational ground state while generating a CARS beam having a frequency $\omega_{AS}$ by way of an intermediate state 704. A frequency of the CARS beam at this occasion is expressed as $\omega_{AS} = 2 \cdot \omega_P - \omega_S$.

FIG. 4 shows one process related to the non-resonance term of Equation 1. A frequency of the stokes beam configures a process not by way of the vibrational excitement state, but by way of an intermediate state 705. The intermediate state 705 related to an electron or the like is excited by simultaneously irradiating the pumping beam having the frequency $\omega_P$ and a stokes beam having a frequency $\omega'_S$, and a non-resonant CARS beam having a frequency $\omega_{AS}$ is generated by way of an intermediate state 704 by further irradiating a probe beam having a frequency $\omega'_P$. In a case where a laser beam having a narrow pulse width is used as the stokes beam, a beam having a broad frequency is irradiated, and therefore, there is a case of including the beam having the frequency $\omega'_P$ or $\omega'_S$ in FIG. 4. The resonant CARS beam and the non-resonant CARS beam are coherent to each other and interfered with each other.

Researches of spectra with regard to various kinds of molecules have been carried out since the Raman scattering was discovered in 1928, and accumulation of data is progressed. Therefore, it is preferable to identify a molecule in reference to the spectra data. CARS beam is expressed by Equations 1 and 2, and a portion in proportion to a Raman scattering spectrum is $\text{Im}[\chi_r^{(3)}(\omega_{AS})]$. This is a complex part of the resonance term, which interferes with the non-resonance term $\chi_{nr}^{(3)}$ as described above, and therefore, the Raman scattering spectrum cannot directly be obtained by the spectrum obtained by CARS.

A development of a method of extracting the Raman scattering spectrum from the CARS spectrum is an important problem, and various systems have been developed therefor (J. P. R. Day, K. F. Domke, G. Rago, H. Kano, H. Hamaguchi, E. M. Vartiainen, and M. Bonn "Quantitative Coherent Antistokes Scattering (CARS) Microscopy," J. Phys. Chem. B, Vol. 115, 7713-7725 (2011)). For example, according to a maximum entropy method which is a method of recovering a phase spectrum from an intensity spectrum, a complex part of a resonance term is calculated by carrying out a mathematical calculation. Or, there is also a method making use of interference (C. L. Evans, E. O. Potma, X. S. and Xie, "Coherent Anti-Stokes Raman Scattering Spectral Interferometry: Determination of the Real and Imaginary Components of Nonlinear Susceptibility χ(3) for Vibrational Microscopy," Opt. Lett. Vol. 29, 2923-2925 (2004)). According to the method, a CARS signal is generated by simultaneously focusing a pumping beam and a stokes beam to an observed sample by a condenser lens. On the other hand, a non-resonant CARS signal is obtained by irradiating a separate sample which generates the non-resonant CARS signal with a pumping beam and a stokes beam. The non-resonant CARS signal is made to be a local beam and the both CARS signals are interfered with each other. The local beam of the non-resonance signal is made to be a circularly polarized beam by a λ/4 plate, and a polarizing direction of the CARS beam from the observed sample is rotated by 45 degrees by a λ/2 plate. An interference beam of the beams is separated into two different linearly polarized beams, and the respective beams are subjected to spectrometry by a spectroscope. When an electric field of CARS from the observed sample is designated by notation $E_{AS}(\omega)$ and an electric field of the local beam is designated by notation $E_{LO}$, respective interference signals are expressed as follows.

Equation 3

$$S_C(\omega) = |E_{LO}|^2 + |E_{AS}(\omega)|^2 + 2|E_{LO}E_{AS}(\omega)|\cos \Phi(\omega) \qquad (3)$$

Equation 4

$$S_S(\omega) = |E_{LO}|^2 + |E_{AS}(\omega)|^2 + 2|E_{LO}E_{AS}(\omega)|\sin \Phi(\omega) \qquad (4)$$

Here, notation $\Phi(\omega)$ expresses a phase difference between the local beam and the CARS signal beam, and is expressed as $\Phi(\omega) = \omega\tau + \theta_S(\omega) + \theta_{inst}(\omega)$. Notation COT designates an optical path difference between the two beams, notation $\theta_S(\omega)$ designates a phase difference by a resonant beam, and notation $\theta_{inst}(\omega)$ designates a phase difference originated from an apparatus. $|E_{LO}|^2$ and $|E_{AS}(\omega)|^2$ in Equations 3 and 4 can be calculated by cutting off one of them. Therefore, $\tan \Phi(\omega)$ can be calculated and also $\Phi(\omega)$ can be determined from Equations 3 and 4. First, $\omega\tau + \theta_{inst}(\omega)$ is determined by measuring a sample which generates only the non-resonant CARS beam as an observed sample. Next, an observed sample which generates the resonant CARS is measured. $\theta_S(\omega)$ can be determined thereby, and therefore, the complex part of the resonance component can be calculated as $|E_{AS}(\omega)|\sin \theta_S(\omega)$. Thereby, what corresponds to the Raman scattering spectrum can be obtained.

The above-described method is a method of determining $\omega\tau + \theta_{inst}(\omega)$ accurately by using the sample which generates the non-resonant CARS beam. However, when there are known a peak frequency of the CARS spectrum which is obtained previously and a frequency by which the spectrum becomes flat in a case of small frequency dependency of $\theta_{inst}(\omega)$, there may be set $\theta_{inst}(\omega)$ as an initial value for realizing the spectrum. In this case, a reference sample which generates the non-resonance CARS beam is not needed.

There is a Raman scattering spectrum region (1800 through 800 cm$^{-1}$) which is referred to as a fingerprint region as a spectrum region which is sensitive to a molecular structure. It is preferable to obtain a spectrum of a similar region also in detecting a CARS beam. According to the system introduced in J. P. R. Day, K. F. Domke, G. Rago, H. Kano, H. Hamaguchi, E. M. Vartiainen, and M. Bonn "Quantitative Coherent Anti-stokes Scattering (CARS) Microscopy," J. Phys. Chem. B, Vol. 115, 7713-7725 (2011), a spectrum width of the stokes beam for excitement is about 140 cm$^{-1}$, and the system cannot cover the region. There is introduced a system of using a photonic fiber as a light source for compensating for the drawback in M. Okuno, H. Kano, P. Leproux, V. Couderc, J. P. R. Day, M. Bonn, and H. Hamaguchi, "Quantitative CARS Molecular Fingerprinting of Single Living Cells with the Use of the Maximum Entropy Method," Angew. Chem. Int. Ed. Vol. 49.6773-6777 (2010). There is generated a broadband beam which is referred to as Super Continuum Beam (SC beam) by irradiating a photonic fiber with an extremely short pulse laser.

SUMMARY OF THE INVENTION

There is "noninvasiveness" which is regarded as useful when a living cell is observed by CARS. Extremely short pulse beams of a pumping beam and a stokes beam are simultaneously irradiated in order to generate CARS. Generally, a wavelength which is not absorbed by a living cell is used in wavelengths of the both excited beams used in CARS. Therefore, it can be said that the "noninvasiveness" is established in a state of a low peak power, and the cell is not damaged. However, when the peak power is increased excessively, a multiphoton process is brought about, and there is a possibility of effecting an influence on the cell. It is preferable that the peak power of irradiating the living cell is low even when the wavelength is "noninvasiveness". It is a problem of the present invention to improve a signal to noise ratio of a weak CARS signal which is generated under a condition of restraining the peak power of the excited beam and realize a high spatial resolving power.

An optical apparatus for resolving the problem described above is realized by an optical apparatus including a first laser beam having a frequency $\omega_P$, a second laser beam having a frequency $\omega_{ST}$ maintaining a relationship of being coherent with the first laser beam, a third laser beam which is a portion of a super continuum beam and has a frequency of $\omega_{AS} = 2\omega_P - \omega_{ST}$ as a reference beam, an optical system of making the first laser and the second laser beam coincide with each other substantially coaxially, a mechanism of adjusting phases of the first beam and the second beam, an object lens of focusing the first laser beam and the second laser beam, an object lens of detecting a CARS beam generated from an observed sample, an interference optical system of making the CARS beam and the third laser beam interfere with each other, a photo-detector of detecting an interference beam, and an arithmetic unit of processing a signal from the photo-detector. In a case where a display unit is integrated to the optical apparatus, the optical apparatus further includes the display unit of displaying an image based on information of the arithmetic unit.

The wavelength of the first or the second laser beam may be made to be variable in order to acquire a CARS spectrum by the optical apparatus.

A band of the second laser may be made to be a broadband and a spectroscope may be used for detecting a spectrum of the interference beam in order to acquire the CARS spectrum by the optical apparatus.

An optical filter may be installed in an optical path of the reference beam in order to improve a spatial resolving power of the optical apparatus.

According to the present invention, a signal can be amplified by making the CARS beam from the observed body and the reference beam interfere with each other and taking out the signal from the interference beam even in a state of reducing a power density of the irradiated laser beam. Thereby, the noninvasiveness can be maintained, the signal to noise ratio can be improved, and the spatial resolving power can be improved.

DETAILED DESCRIPTION OF THE PREFERRED EMBODIMENTS

An explanation will be given of the best mode for embodying an optical apparatus according to the present invention in reference to the drawings as follows.

First Embodiment

Figure 1:
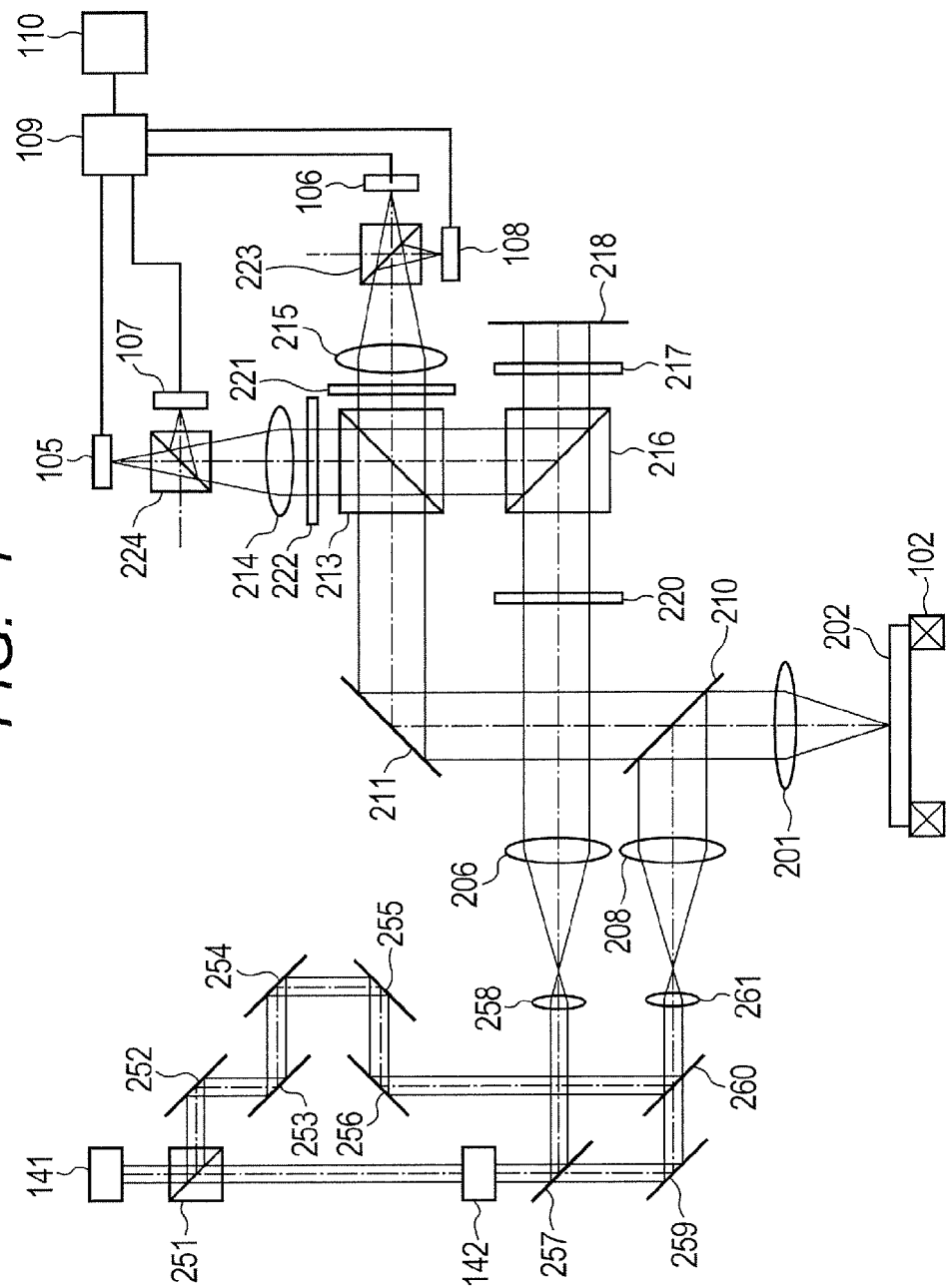
FIG. 1 is a diagram showing an example of an optical apparatus according to the present invention.
Figure 2:
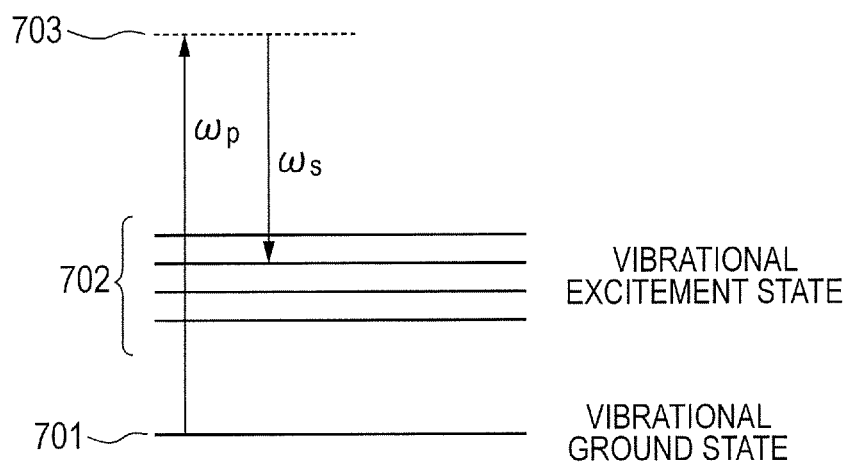
FIG. 2 is an energy level diagram of stokes scattering in ordinary Raman scattering.
Figure 3:
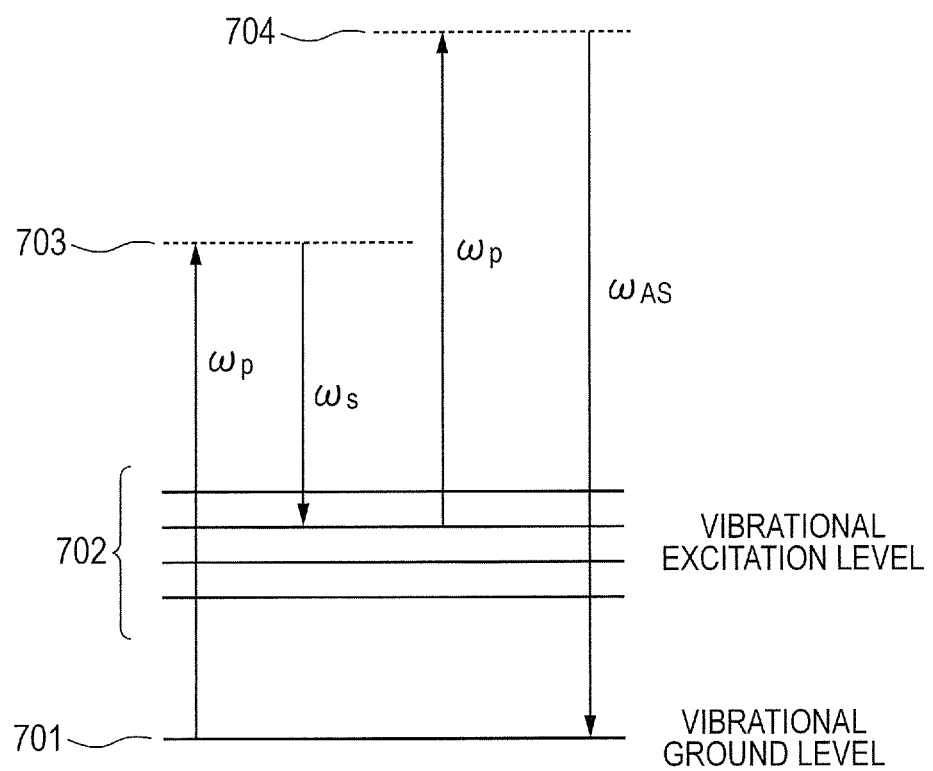
FIG. 3 is an energy level diagram in CARS.
Figure 4:
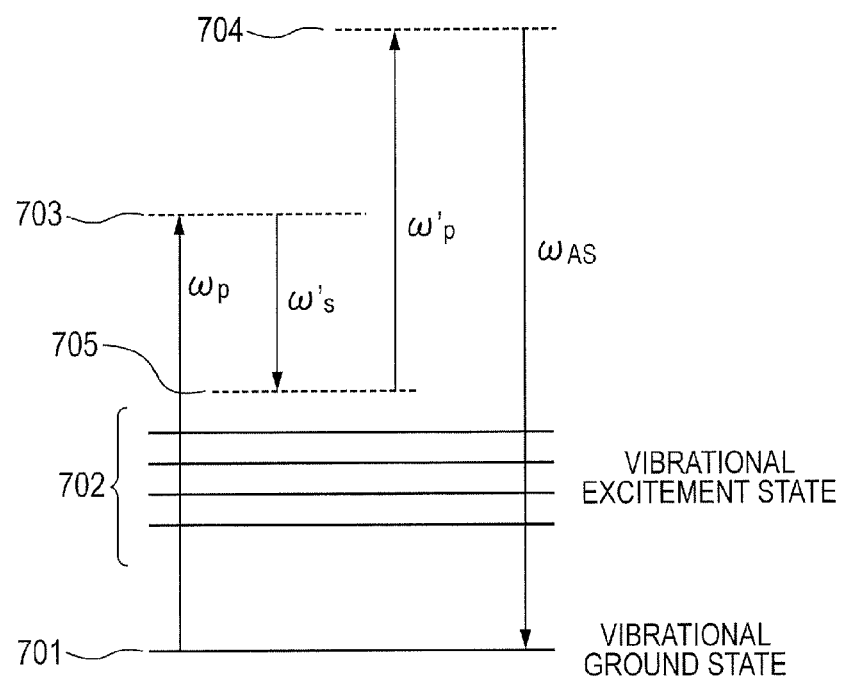
FIG. 4 is an energy level diagram for explaining an example of a non-resonant beam in CARS.
Figure 5:
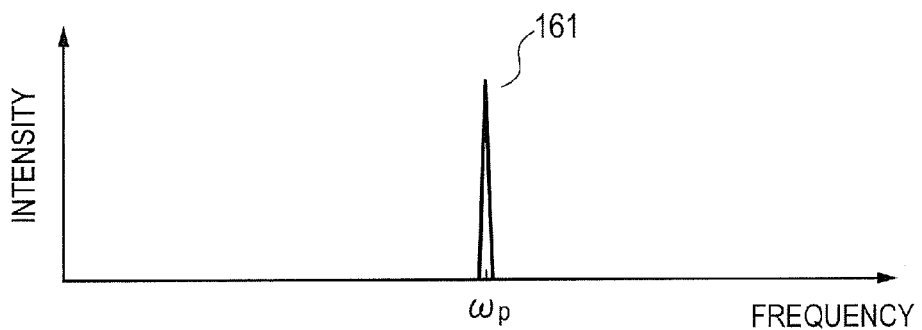
FIG. 5 shows a frequency spectrum of a pulse laser beam.
Figure 6:
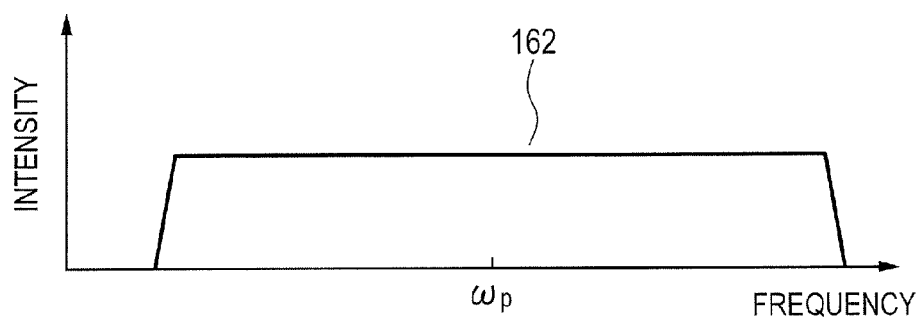
FIG. 6 shows a frequency spectrum of a super continuum beam.
Figure 7:
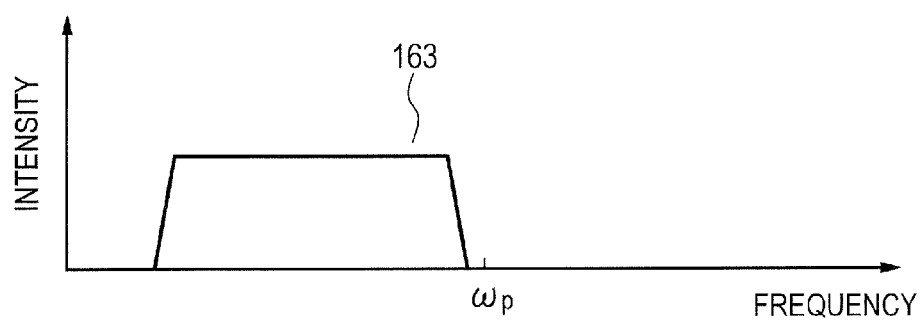
FIG. 7 shows a frequency spectrum of a low frequency region of a super continuum beam used as a stokes beam.
Figure 8:
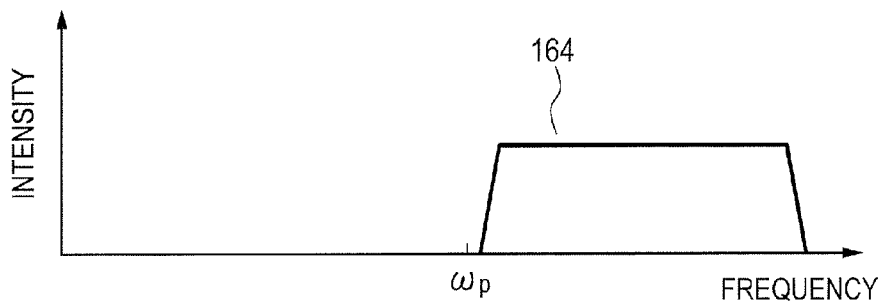
FIG. 8 shows a frequency spectrum of a high frequency region of a super continuum beam which is used as a reference beam.

FIG. 1 shows an optical apparatus based on the present invention. Numeral 141 designates a pulse laser beam source, which emits a laser beam 161 (first beam) having a center frequency $\omega_P$ indicated by a spectrum of FIG. 5. The emitted laser beam is an s-polarized beam in a polarizing direction, and the s-polarized beam is split into two beams by a beam splitter 251. A beam which transmits through the beam splitter is incident on a photonic crystal fiber 142. The incident beam is converted into a beam as shown in a spectrum 162 of FIG. 6 which is referred to as an SC beam. Here, although the SC beam is obtained by the photonic crystal fiber, the SC beam can be obtained by other means of a dispersion-flattened and decreasing fiber, a bi-directional tapered fiber or the like. The SC beam is extended in a wide range including the excited beam frequency $\omega_P$, and a coherent property is maintained. The SC beam is split into two beams by a dichroic mirror 257 with the frequency $\omega_P$ as a boundary. That is, a beam having a low frequency of a region indicated by 163 of FIG. 7 transmits through the dichroic mirror and a beam having a high frequency of a region indicated by a spectrum 164 of FIG. 8 is reflected by the dichroic mirror. A beam transmitted through the dichroic mirror 257 (second beam) is reflected by a mirror 259, transmits through a dichroic mirror 260 and is used as a stokes beam having a frequency $\omega_{ST}$ of a broad band. On the other hand, also a laser beam which is used as a pumping beam having a center frequency $\omega_P$ is incident on the dichroic mirror 260. The laser beam is reflected by the beam splitter 251, further reflected by a mirror 252 and a group of mirrors 253, 254, 255, and 256 for adjusting an optical path difference, thereafter, reaches the dichroic mirror 260. The two laser beams become coaxial beams, are collimated by lenses 261 and 208, thereafter, reflected by a dichroic mirror 210 and focused to an observed sample 202 by an object lens 201. The observed body is made to be able to be scanned by a scanning mechanism 102. Although according to the present embodiment, there is adopted a system of scanning the observed body per se in order to avoid a complication of an optical system, the present embodiment is not limited thereto but there may be adopted a system of mounting an optical system of scanning a converged spot per se. A CARS beam having a frequency $\omega_{AS}=2\omega_P-\omega_{ST}$ generated at the observed body transmits through the object lens 201 and the dichroic mirror 210, reflected by a reflecting mirror 211, thereafter, incident on a half beam splitter 213.

Figure 9:
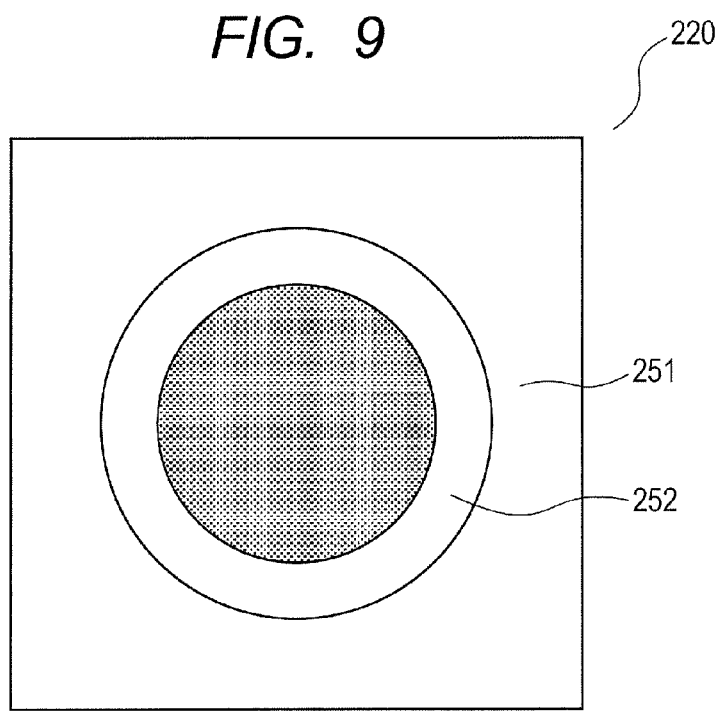
FIG. 9 is a view showing an example of a shape of an optical filter.

Also a laser beam of a high frequency region reflected by the dichroic mirror 257 is an SC beam, and is used as a reference beam (third beam) including the frequency $(\omega_{AS}=2\omega_P-\omega_{ST})$. The reference beam is collimated by lenses 258 and 206, and transmits through an optical filter 220. A laser beam which is partially shielded or decreased by the optical filter 220 transmits through a polarized light beam splitter 216 and a Fresnel rhomb wavelength plate 217 having an effect of a λ/4 plate and is returned to the Fresnel rhomb wavelength plate 217 by a mirror 218. The mirror 218 is used for adjusting the optical path length. A laser beam which transmits through the Fresnel rhomb wavelength plate 217 becomes a p-polarized beam, is reflected by the polarized beam splitter 216, and is directed to the beam splitter 213. FIG. 9 shows a light shielding plate as an example of a shape of the optical filter 220. A circle indicated by numeral 251 shows a beam shape of the reference beam, and a light shielding area 252 is arranged to shield light at a center portion of the beam. The light shielding plate can be fabricated by vapor-depositing a metal thin film of chromium in a circular shape on a glass board through which a beam of a used wavelength transmits. A beam at only a surrounding area of the beam relates to interference, and a spatial resolving power is improved. As a size of the light shielding area, a radius from a center is preferably equal to or larger than 70% of an effective diameter of the beam in order to sufficiently improve the resolving power. According to the present embodiment, the optical filter is arranged at a light path of the reference beam. Thereby, the high resolving power and the high signal to noise ratio can be realized without decreasing the CARS beam from the observed body.

Beams having different polarizing directions are incident on the half beam splitter 213 from two directions, each of the beams is split in two directions, and interference beams are emitted in two directions. A method referred to as phase diversity detection is used for detecting $|E_{AS}(\omega)|$. A Fresnel rhomb wavelength plate 221 having an effect of a $\lambda/2$ plate an optical axis of which is inclined by 22.5 degrees is installed for an interference beam emitted in a right direction of the half beam splitter 213 on paper face, and the beam is converged onto a spectroscope which is placed at a focal point position of a condenser lens 215. A polarized beam splitter 223 is installed at an optical path in front of the spectroscope, the interference beam is separated into components in an s direction and in a p direction, and the respective beams are detected by a spectroscope 106 and a spectroscope 108. Here, the observed body is made to be a point body which is present on an optical axis of a focal point face, and a complex amplitude of the CARS beam of the observed object, and a complex amplitude of the reference beam are respectively made to be $E_{AS}(\omega)$ and $E_{LO}$. When a differential signal of respective frequencies of the respective beams at the spectroscope 106 and the spectroscope 108 is designated by notation $I_C(\omega)$, the difference signal is expressed as $I_C(\omega)=\alpha|E_{AS}(\omega)|\cdot|E_{LO}|\cos\Phi(\omega)$. Notation $\alpha$ designates a coefficient including signal amplification and a spectroscope efficiency, and notation $\Phi(\omega)$ designates a phase difference of the CARS beam from the observed object and the reference beam. A Fresnel rhomb wavelength plate 222 having an effect of a 214 plate an optical axis of which is inclined by 45 degrees is inserted to an interference beam which is emitted in an upper direction of the half beam splitter 213 on paper face. The interference beam converged by a condenser lens 214 is detected by spectroscopes 105 and 107. The interference beam is separated into an s-polarized beam and a p-polarized beam by a polarized beam splitter 224 which is installed at a midway, and thereafter, detected by the respective spectroscopes. Here, when a differential signal of respective frequencies of the spectroscopes 105 and 107 is designated by notation $I_S(\omega)$, the differential signal is expressed as in $I_S(\omega)=\alpha|E_{AS}(\omega)||E_{LO}|\sin\Phi(\omega)$. Only interference components are detected in $I_c(\omega)$ and $I_S(\omega)$. An arithmetic unit 109 carries out a calculation shown below.

Equation 5

$$I(\omega)=\sqrt{(I_C^2(\omega)+I_S^2(\omega))}=\alpha|E_{AS}(\omega)||E_{LO}| \quad (5)$$

$I(\omega)$ is configured by a form proportional to an amplitude of the CARS beam of the observed object and an amplitude of the reference beam. Therefore, $I(\omega)$ in a form of amplifying $|E_{AS}(\omega)|$ can be obtained by enlarging $|E_{LO}|$ which has no wavelength dependency. Generally, a spectrum of an SC beam is not flat, and therefore, it is necessary to carry out a correction which uses the amplitude spectrum of the SC beam in order to acquire further accurate spectrum $I(\omega)$. Next, a complex component $[I(\omega)\sin\theta_S(\omega)]$ of a resonance term is obtained by calculating a phase difference which is generated by a resonant beam, that is, by the method of using an interference described above, or by extracting a complex component of a resonance term of the CARS beam by the maximum entropy method. A detector of CCD or the like may be used for detecting by a spectroscope. Numeral 110 designates a display unit, and there is carried out a display with a display position corresponding to a scan position of the observed body 202. A distribution of a molecule can be known by displaying $I(\omega)$ at a frequency position that is characteristic to a vibration of the molecule.

Assume that a point body as the observed body on a focal point face that is present at a location remote from an optical axis by a distance a on x-axis is irradiated with a pumping beam and a stokes beam, and a CARS beam is generated. Two-dimensional amplitude point image distribution functions of the pumping beam and the stokes beam are respectively designated by notations $h_P$ and $h_S$, and a two-dimensional amplitude point image distribution function of the generated CARS beam on a spectroscope is designated by notation $h_{AS}$. There is formed a point image distribution $h_{AS}$ (x−Ma, y) centering on a position remote from an optical axis by Ma on the respective four spectroscopes by designating a magnification of an optical system by notation M. Also, simultaneously, the reference beam is configured by a point image distribution $h_{AS}(x, y)$ centering on an optical axis. When a two-dimensional point image distribution function at a certain wavelength of the CARS beam which is formed from an output of Equation 5 as a result of interference is designated by notation $h_{CARS}$, a two-dimensional amplitude point image distribution function $|h_{CARS}(a, 0)|$ which adopts an absolute value on x-axis is expressed as follows.

Equation 6

$$|h_{CARS}(a,0)|=|h_P(a,0)|^2|h_S(a,0)||\int\int h_{AS}(x-Ma,y)h_{AS}(x,y)dxdy| \quad (6)$$

A surface integral is carried out on the detector. Since a coherent optical system is configured, optically, the point image distribution function is configured by squaring Equation 6. However, also $Im[\chi_r^{(3)}(\omega_{AS})]$ proportional to a concentration of a substance is configured by a squared form, and therefore, a square sign is not attached to Equation 6. A point image distribution function in an ordinary optical system which does not use a CARS beam and does not use an interference optical system becomes $|h_P(a, 0)|^2$, in, for example, a wavelength of a pumping beam. In comparison with the ordinary point image distribution function, in Equation 6, the point image distribution function of the CARS beam is narrowed since a part of an excitation beam is multiplied by $|h_S(a, 0)|$ and also multiplied by an integration term in Equation 6, and then a resolving power is improved. In a case of arranging an optical filter at the reference beam, a two-dimensional amplitude point image distribution function $h_{AS}(x, y)$ of the reference beam in an integration of Equation 6 can be narrowed. Therefore, the point image distribution function of the CARS beam is further narrowed, and the spatial resolving power is improved.

Figure 10:
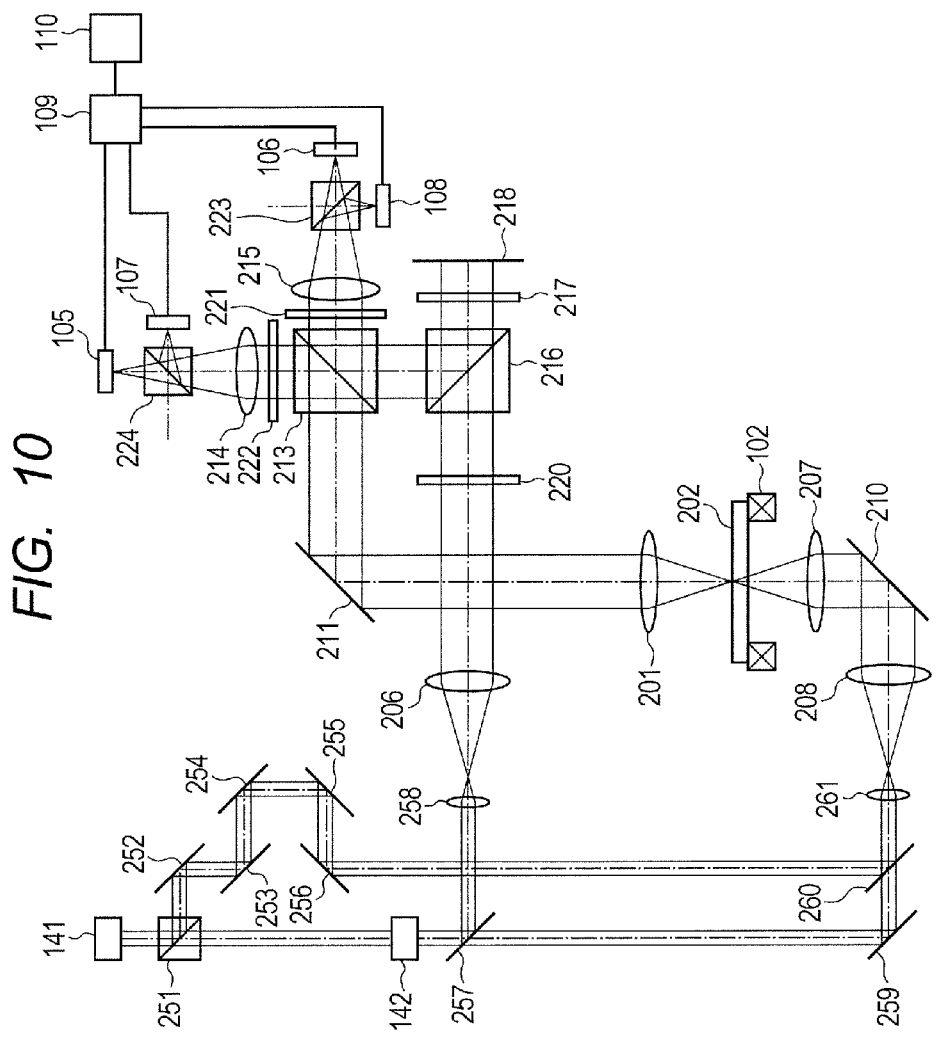
FIG. 10 is a diagram showing an example of an optical apparatus according to the present invention.

FIG. 10 shows an embodiment of a transmission type. An intensity distribution in an emitting direction of a CARS beam differs by a shape and a size of an observed body. Generally, the larger the observed body which includes a molecule that emits a CARS beam, the weaker the backward scattering of the CARS beam. On the other hand, inverse dependency is shown in forward scattering. The embodiment shown in FIG. 10 is constructed by a configuration for detecting a CARS beam of forward scattering. A difference of the configuration of FIG. 10 from the configuration of FIG. 1 resides in that directions of irradiation of a pumping beam and a stokes beam are directed to the observed sample oppositely to directions of the configuration of FIG. 1. That is, a stokes beam (second beam) which transmits through the dichroic mirror 257 and a pumping beam (first beam) which is reflected by the mirror 256 are respectively made to be coaxial beams by the mirror 259 and the dichroic mirror 260, and made to be collimated beams by the lenses 261 and 208. The collimated coaxial laser beam is reflected by the mirror 210, thereafter, focused onto the observed sample 202 by an object lens 207. A CARS beam which is generated from the observed sample in a forward direction transmits through the object lens 201, and an interference measurement similar to that of the embodiment of FIG. 1 is carried out.

Although the embodiment of FIG. 1 and the embodiment of FIG. 10 are configured by separate optical systems, the embodiments can be embodied by a single optical system by switching an optical path.

In the embodiment described above, there is adopted a system of interfering linearly polarized beams orthogonal to each other, and the phase diversity detection is carried out. As other system, there is also a method of making the CARS beam from the observed body and the reference beam orthogonal to each other in a state of circularly polarized beams and interfering the CARS beam and the reference beam. For example, the CARS beam is made to be a right-handed circularly polarized beam and the reference beam is made to be a left-handed circularly polarized beam. When the optical axis of a polarizer for detecting the interfered beam is set to 0, 45, 90, 135 degrees, there are acquired beams having phase differences of 0, 90, 180, 270 degrees relatively. A signal expressed by Equation 5 can be obtained by combining the signals, and an effect similar to that of the embodiment described above can be achieved.

Second Embodiment

Figure 11:
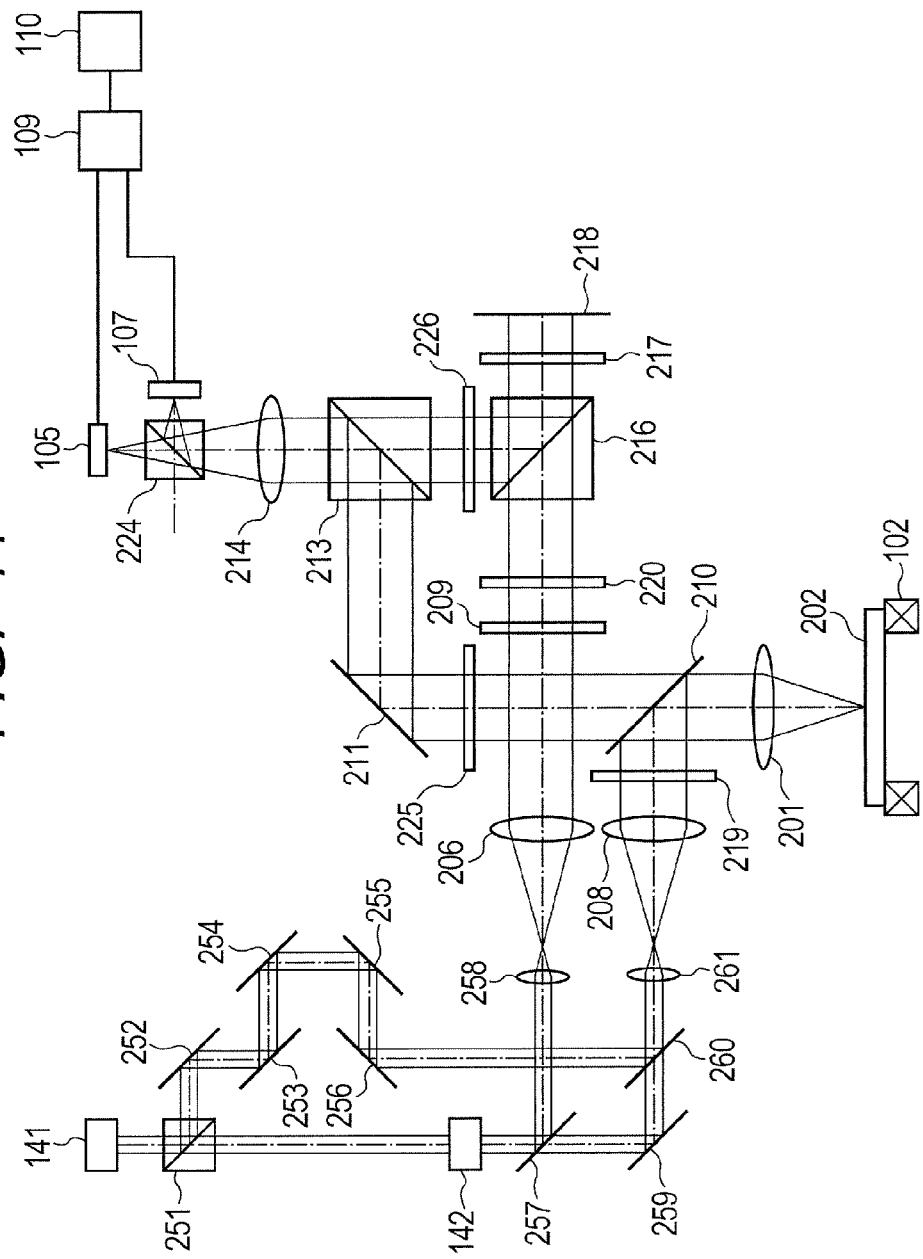
FIG. 11 is a diagram showing an example of an optical apparatus according to the present invention.

In an embodiment of FIG. 11, a simplification is achieved by making a number of detection beams in the embodiment of FIG. 1 as 2 pieces. The pumping beam (first beam) and the stokes beam (second beam) which are made to coaxial by the dichroic mirror 260 are collimated, transmit through an optical shutter 219 and converged to the observed sample 202. A CARS beam having a frequency of $\omega_{AS}=2\omega_P-\omega_{ST}$ which is generated from the observed sample is converted into a circularly polarized beam by a Fresnel rhomb wavelength plate 225 and is incident on the half beam splitter 213 by the mirror 211. Also, the laser beam (third beam) of a high frequency region reflected by the dichroic mirror 257 is collimated by the lenses 258 and 206, and used as the reference beam including the frequency $(2\omega_P-\omega_{ST})$. The reference beam transmits through an optical shutter 209 and the optical filter 220 for realizing the high resolving power. Thereafter, the reference beam transmits through the polarized beam splitter 216, converted into a circularly polarized beam by the Fresnel rhomb wavelength plate 217, and reflected by the mirror 218 for adjusting an optical path length. The reflected reference beam becomes an inversely rotated circularly polarized beam, becomes a p-polarized beam by the Fresnel rhomb wavelength plate 217, and is reflected by the polarized beam splitter 216. Numeral 226 designates a Fresnel rhomb wavelength plate having an effect of a λ/2 plate an optical axis of which is inclined by 22.5 degrees, which inclines a polarizing direction of the reference beam by 45 degrees. The reference beam is incident on the beam splitter 213 and interferes with the CARS beam from the observed sample that is incident from the left side. A superposed beam is directed to the condenser lens 214, the converged interference beam is split into two beams by the polarized beam splitter 224, and the split two beams are focused respectively on the spectroscopes 105 and 107. When the optical shutter 219 and 209 are opened, a signal expressed by Equation 3 is outputted from the spectroscope 105, and a signal expressed by Equation 4 is outputted from the spectroscope 107. $|E_{LO}|^2$'s are outputted from the respective spectroscopes 105 and 107 by closing the optical shutter 219 and opening the optical shutter 225. Conversely, $|E_S(\omega)|^2$'s are outputted from the respective spectroscopes by opening the optical shutter 219 and closing the optical shutter 225. $|E_{LO}E_S(\omega)|$ is calculated from the outputs by the arithmetic unit 109. A result equivalent in Raman spectroscopy is acquired by extracting the complex component of the resonance term of the CARS beam by the maximum entropy method, or extracting the complex component $[I(\omega) \sin \theta_S(\omega)]$ of the resonance term by calculating the phase difference generated by the resonance beam by the method of using interference described above by using the result.

Third Embodiment

Figure 12:
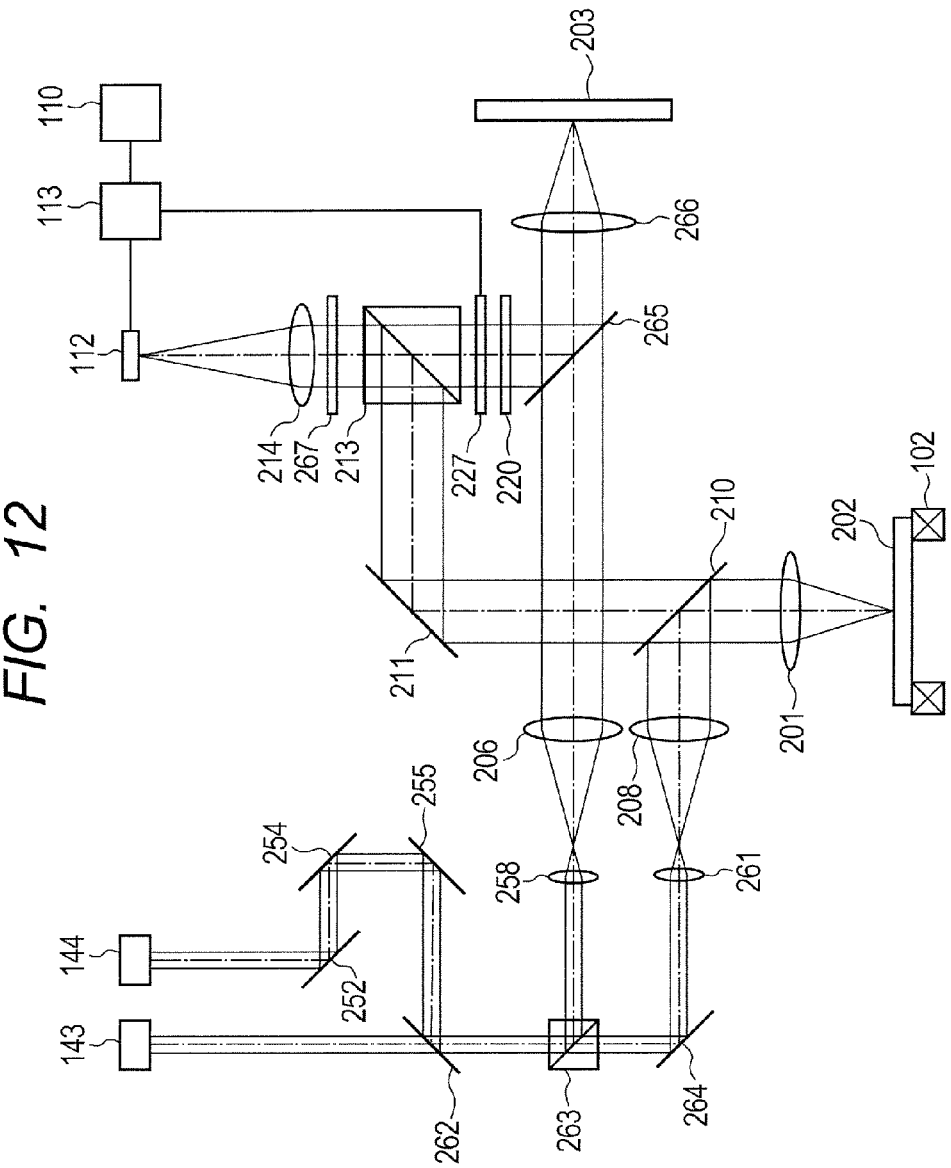
FIG. 12 is a diagram showing an example of an optical apparatus according to the present invention.

A spectroscope is not used in an embodiment of FIG. 12. Thereby, an apparatus can be downsized. Numeral 143 designates a light source for a pumping beam (first beam) having a frequency $\omega_P$, and numeral 144 designates a light source of a stokes beam (second beam) having a frequency $\omega_{ST}$. The both beams are synchronized mode-locked lasers, and pulse lasers of narrow bands. A wavelength of the pumping beam is made to be variable by an optical parametric oscillator. The mirrors 252, 254, and 255 are for adjusting an optical path length of the stokes beam. The pumping beam and the stokes beam become coaxial beams by a dichroic mirror 262, and the coaxial beam is split into two beams by a beam splitter 263. A transmitted coaxial beam is reflected by a mirror 264, and collimated by the lenses 261 and 208. The collimated coaxial beam is reflected by the dichroic mirror 210 and is focused onto the observed sample by the object lens 201. A generated CARS beam from the observed sample transmits through the object lens 201 and the dichroic mirror 210, and is directed to the beam splitter 213. A coaxial beam reflected by the beam splitter 263 is collimated by the lenses 258 and 206, transmits through a dichroic mirror 265, thereafter, converged onto a reference beam generating sample 203 by an object lens 266. Only a CARS beam of a non-resonant beam is generated from the reference beam generating sample and is used as a third beam. The CARS beam which is a reference beam transmits through the object lens 266, and is reflected by the dichroic mirror 265. Numeral 220 designates the optical filter having the function of improving the spatial resolving power. The optical filter is provided to an optical path of the reference beam, which is for simultaneously realizing a high resolving power and a high signal to noise ratio. Numeral 227 designates a phase modulator and provides a phase difference between the CARS beam from the observed sample and the third beam. Although according to the present embodiment, a phase of the third beam is modulated by the phase modulator, a similar effect is achieved even by modulating a phase of the first or the second beam, or the CARS beam generated from the observed sample 202. The CARS beams from the observed sample and the reference beam generating sample are superposed by the beam splitter 213, and transmit through a long wavelength cut filter 267. The long wavelength cut filter 267 removes the pumping beam and the stokes beam. The interference beam is focused onto a detector 112 by the lens 214, and detected. The detector 112 is a detector of an avalanche photodiode, and here, a spectroscope is not used. A detecting signal is processed by a lock-in amplifier 113 and is displayed on the display unit 110. Here, when a phase difference of the CARS beams from the observed sample and the reference beam generating sample is designated by notation 8, the detecting signal is expressed as follows.

Equation 7

$$S(\omega_{AS}) = |E_{LO}|^2 + |E_{AS}(\omega_{AS})|^2 + 2|E_{LO}E_P^2(\omega_P) \\ E_S(\omega_S)|\{[\chi_{nr}^{(3)} + \text{Re}\chi_r^{(3)}(\omega_{AS})]\cos\delta + [\text{Im}\chi_r^{(3)}(\omega_{AS})]\sin\delta\} \quad (7)$$

Notation $E_{LO}$ designates an amplitude of a non-resonant CARS beam from the reference beam generating sample, and notation $E_{AS}(\omega_{AS})$ designates an amplitude of a CARS beam generated from the observed sample. When the phase difference $\delta$ is modulated by the phase modulator 227, the phase difference $\delta$ is converted into an intensity modulation as shown in Equation 7. A value proportional to $\text{Im }\chi_r^{(3)}(\omega_{AS})$ can be acquired by configuring the detecting signal by taking out a sine component by phase sensitive detection by the lock-in amplifier 113. When a wavelength of the pumping beam is changed, also $\omega_{AS}$ is changed, and a spectrum can be acquired. A distribution of a specific molecule can also be measured by making the wavelength of the pumping beam coincident with a resonance wavelength of the molecule and scanning the observed sample 202 by the scanning mechanism 102.

Incidentally, although in the present embodiment, the wavelength of the first beam is made to be variable, the wavelength of the stokes beam which is the second beam may be made to be variable. A spectrum can be acquired without using a spectroscope by making the wavelength of the first or the second beam variable.

Although in any of the embodiments described above, the example of scanning the observed body is shown, the scanning is not limited to the observed body, but the optical system may be scanned.

According to the present invention, there can be acquired an image using a CARS beam and having a high resolving power, and the present invention can be applied to an optical apparatus for noninvasively measuring a distribution of a molecule of an organism or a change in the distribution.

What is claimed is:

1. An optical apparatus comprising:
    a first beam having a frequency $\omega_P$;
    a unit for generating a super continuum beam;
    a split unit for dividing the super continuum beam into a second beam and a third beam with the frequency $\omega_P$ as a boundary;
    the second beam having a frequency lower than the frequency $\omega_P$ maintaining a relationship of being coherent with the first beam;
    the third beam which is a reference beam having a frequency of $\omega_{AS} = 2\omega_P - \omega_{ST}$, the frequency being higher than the frequency $\omega_P$ and which is a beam that does not irradiate an observed sample;
    an optical system configured to make the first beam and the second beam coincide with each other substantially coaxially;
    a mechanism configured to adjust phases of the first beam or the second beam;
    an object lens configured to focus the first beam and the second beam;
    an object lens configured to detect a CARS beam generated from an observed sample;
    an interference optical system configured to make the CARS beam and the third beam interfere with each other coaxially;
    a photo-detector configured to detect an interference beam; and
    an arithmetic unit configured to process a signal from the optical detector.

2. The optical apparatus according to claim 1, wherein the second beam is a laser beam of a broadband, and an interference beam is directed to a spectroscope are used.

3. The optical apparatus according to claim 2, wherein the interference beam is formed by making use of the second beam transmitted through the observed sample.

4. The optical apparatus according to claim 1, further comprising:
    an image display unit configured to display an image based on the arithmetic unit.

5. The optical apparatus according to claim 1, wherein an optical filter is installed at an optical path of the reference beam.

6. The optical apparatus according to claim 5, wherein the optical filter mainly shields the third beam at a vicinity of an optical axis of the optical filter, and transmits the third beam at a surrounding of the optical filter remote from the optical axis.

7. The optical apparatus according to claim 1, wherein the object lens of focusing the first beam and the second beam and the object lens of detecting the CARS beam is the same lens.

* * * * *